United States Patent [19]
Gutowski et al.

[11] Patent Number: 5,066,442
[45] Date of Patent: Nov. 19, 1991

[54] METHOD OF PRODUCING A COMPOSITE ARTICLE

[75] Inventors: Timothy G. Gutowski, Newton; Michael F. Sentovich, Boston, both of Mass.; Richard K. Okine, Wilmington, Del.

[73] Assignees: Massachusetts Institute of Technology, Cambridge, Mass.; E. I. Du Pont de Nemours & Co., Wilmington, Del.

[21] Appl. No.: 580,369

[22] Filed: Sep. 6, 1990

Related U.S. Application Data

[63] Continuation of Ser. No. 317,006, Feb. 28, 1989, abandoned.

[51] Int. Cl.$^5$ ............................................. B29C 43/02
[52] U.S. Cl. ..................................... 264/154; 264/257; 264/273; 264/294; 425/125
[58] Field of Search ............... 264/36, 154, 155, 156, 264/257, 258, 255, 275, 250, 273, 294; 425/DIG. 37, 125

[56] References Cited

U.S. PATENT DOCUMENTS

| | | | |
|---|---|---|---|
| 1,482,045 | 1/1924 | Stearns | 264/257 |
| 1,752,295 | 4/1930 | Felix | 264/257 |
| 2,903,388 | 9/1959 | Jonke | 264/258 |
| 3,021,241 | 2/1962 | Schneiderman | 264/258 |
| 3,597,800 | 8/1971 | Silverman | 425/DIG. 37 |
| 3,673,611 | 7/1972 | Cain | 264/258 |
| 3,839,532 | 10/1974 | Drake | 264/257 |
| 4,013,750 | 3/1977 | Magidson | 264/136 |
| 4,132,519 | 1/1979 | Reed | 264/156 |
| 4,456,576 | 6/1984 | Cotte | 264/275 |
| 4,486,372 | 12/1984 | Millard | 264/258 |
| 4,828,781 | 5/1989 | Duplessis | 264/155 |

Primary Examiner—Jay H. Woo
Assistant Examiner—Jeremiah F. Durkin, II
Attorney, Agent, or Firm—Thomas J. Engellenner; Ralph A. Loren

[57] ABSTRACT

A new method of forming composites or laminates into complex shapes has been developed. A process using a die with piercing studs allows control of fibers motion during processing, leading to better composite parts.

8 Claims, 3 Drawing Sheets

METHOD OF PRODUCING A COMPOSITE ARTICLE

This application is a continuation of application Ser. No. 317,006, filed Feb. 28, 1989, now abandoned.

BACKGROUND OF THE INVENTION

The present invention relates to methods of producing shaped articles formed of composites or laminates. More particularly, the present invention allows the formation of complex or difficult shapes out of fiber/thermoplastic resin composites while controlling the final fiber positioning.

Because of their strength, composites or laminates of fibers and thermoplastic resins are useful in the production of a number of shaped parts. These composites are primarily made of continuous or discontinuous fibers of fiberglass, graphite, carbon, polyaramides such as KEVLAR, polyethylene, or other strengthening fibers bound in a thermoplastic resin. Continuous fiber composites are frequently manufactured in the form of sheets or panels.

Unfortunately, the reinforcing fibers which strengthen the resin and give the composite additional support and structural integrity can cause problems during processing and forming operations, particularly in the manufacturing of parts having complex shapes such as rectangular boxes or spherical surfaces. When such complex shapes are formed using standard molding techniques, e.g., by heating the composite and molding it to the desired shape under pressure, the reinforcing fibers move and slide, causing some portions of the molded piece to have few or no fibers while other sections have too many fibers. This movement of fibers leads to a difference in mechanical properties at various locations in the final product. This variation in quality can lead to rejection of the part, or if the problem is less severe, overdesign of the part.

In order to prevent these problems, some complex shapes have been formed by creating the composite in situ, e.g., laying the fibers into a mold in the final shape and adding heat and pressure to soften and consolidate the thermoplastic components. This procedure is more expensive than conventional procedures and still may not solve the problem of fiber movement and the resulting property differential. Therefore, the search for better ways of forming complex molded products of composites has been continuing.

Accordingly, an object of the invention is to provide a method forming composites or laminates into desired shapes while controlling fiber movement.

A further object of the invention is to provide a method of forming a complex shape from a composite while organizing the fibers of the composite in a predetermined pattern.

Another object of the invention is to provide a method for further strengthening complex shaped articles formed from composites.

These and other objects and features of the invention will be apparent from the following description and the drawing.

SUMMARY OF THE INVENTION

The present invention features a method of making a composite or laminate into a desired, shape, or a variety of predetermined complex shapes, while controlling the placement of the fibers in the laminate during processing. The objects of the invention are achieved by using a special piercing die which allows control of the fibers in the composite during the molding process.

As a two stage process, two molds or dies are provided in the method of the invention: a first shaping die for forming the composite into an approximation of the final desired shape with desired fiber placement, and a second shaping die in the form of the final shape which is used to complete the molding process. The first shaping die has piercing studs or pins at preselected locations and is thus called a piercing die. These studs or pins may be somewhat flexible, or have a complex shape in order to better penetrate the composite. The composite sheet, which is formed of a thermoplastic resin with fibers therethrough, is normally heated to a temperature above the melting point of the thermoplastic resin and the composite is formed into an approximation of the final shape in the first shaping die. The composite may be heated outside the die or the die itself may be heated to a sufficiently high temperature that during processing, the composite reaches the desired temperature. In this first or rough forming step, the piercing studs in the first shaping die are allowed to at least partially pierce the laminate at predetermined locations so that they push the fibers aside rather than breaking them. These studs lock the fibers at particular locations, thereby controlling fiber movement, and keeping the fibers from moving from areas of high tension to low tension. The resultant fiber control, which ensures that the composite retains the predetermined pattern of the fibers, is accomplished by the positioning, and size of, the studs. The studs may or may not be coated with a release or other agent before the molding process.

After the composite is made into an approximation of the final shape in the first shaping die, it is then ready for further processing. In one embodiment, the workpiece is allowed to partially cool in the first shaping die until it attains sufficient structural integrity then it is removed and placed on a second shaping die. The work piece is then heated and molded on the second shaping die into the final shape. The second shaping die, which forms the composite into the shape of the final workpiece, is normally a second die; however, in one of the preferred embodiments of the invention, the second shaping die may be the same as the first shaping die. This is accomplished by having retractable piercing studs in one portion of the die. As the rough forming step forms the approximate shape, the studs retract, forming a smooth die to complete final processing, and allowing the holes formed in the rough forming step to be healed.

In another embodiment of the invention, through the thickness or transverse reinforcing materials, e.g., fibers can be inserted into the composite after the rough forming step for additional strengthening. To accomplish this, the holes formed by the piercing studs in the composite can be filled with fibers or other reinforcing materials, which may or may not be the same material as the fibers in the laminate, in a direction roughly perpendicular to the laminate surface. In some cases, the studs themselves could release from the die and become the reinforcing medium or inserts. These inserts strengthen the laminate by acting as a third dimensional barrier to failure. If transverse reinforcing fibers or inserts are not used, the holes formed by the piercing studs in the rough forming step are then filled in by resin and fibers during the final forming step.

The edges of the composite may or may not be clamped during either step but clamping during the first, rough forming step can provide sufficient tension on the composite during the piercing and rough forming to prevent fiber wrinkling and buckling. This is particularly useful for composites which have discontinuous fibers; however, clamping which allows some slipping may still be helpful even if continuous fibers are used.

DETAILED DESCRIPTION OF THE INVENTION

The method of the present invention allows the formation of complex shapes from laminates or composites with controlled fiber placement. This process can easily produce shapes which were previously exceptionally difficult to manufacture, e.g., hemispheres or box shapes. By controlling the fiber location in the processing, the final product is stronger and more durable than those previously known.

Figure 1:
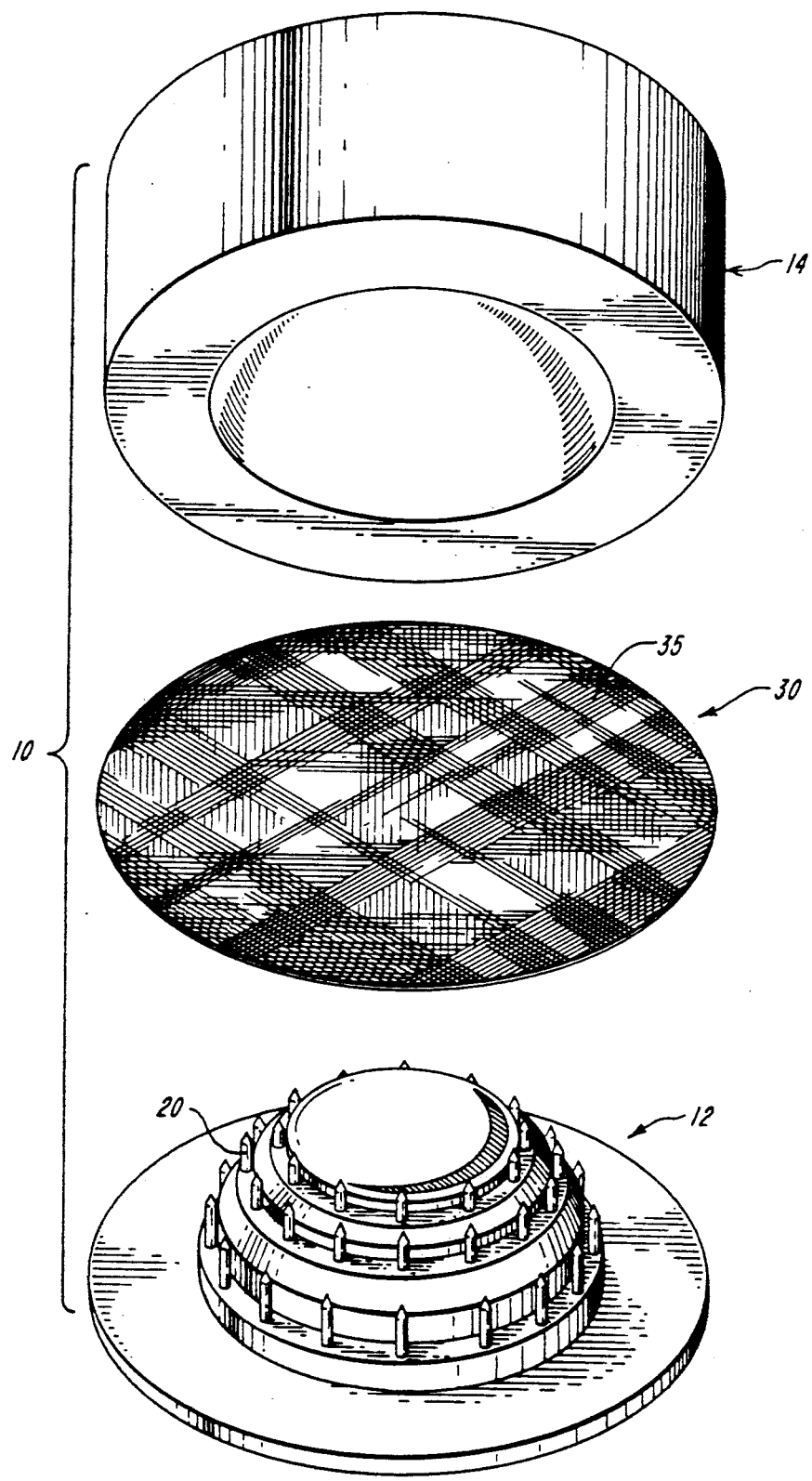
FIG. 1 is an exploded perspective illustration of a first shaping die useful in the invention showing the piecing studs and an unshaped composite sheet.

FIG. 1 illustrates a first shaping or piercing die 10 useful in the invention. The piercing or male portion 12 of the die 10 has a series of piercing studs 20 located in a predetermined pattern. These studs, which may have any length but preferably are longer than the thickness of the composite or laminate sheet 30, are forced onto laminated sheet 30, piercing laminate 30 and forcing reinforcing fibers 35 apart. Fibers 35 are controlled in their movement by the location of piercing studs 20 so that by selection of the proper pattern of piercing studs 20, the pattern of fibers 35 in the finished product can be predetermined.

In operation, the clamped or unclamped composite or laminated sheet 30 may be clamped on female portion 14 of piercing die 10 and male portion 12, carrying piercing studs 20, is forced onto laminate 30 and female portion 14. The positions of the parts of piercing die 10 can be reversed. Laminate 30 may be preheated up to or above the melting temperature of the thermoplastic resin therein, or piercing die 10 may be heated to a sufficiently high temperature that laminate 30 softens in the die.

As the die is closed, piercing studs 20 penetrate laminate 30, pushing aside rather than breaking fibers 35. The location of piercing studs 20 are set to control the movement of fibers 35. Once die 10 is closed, laminate 30 has achieved the approximate shape of the final workpiece. Die 10 and workpiece 30 may be allowed to cool somewhat in the closed position until laminate 3 has sufficient structural integrity for removal.

Figure 2:
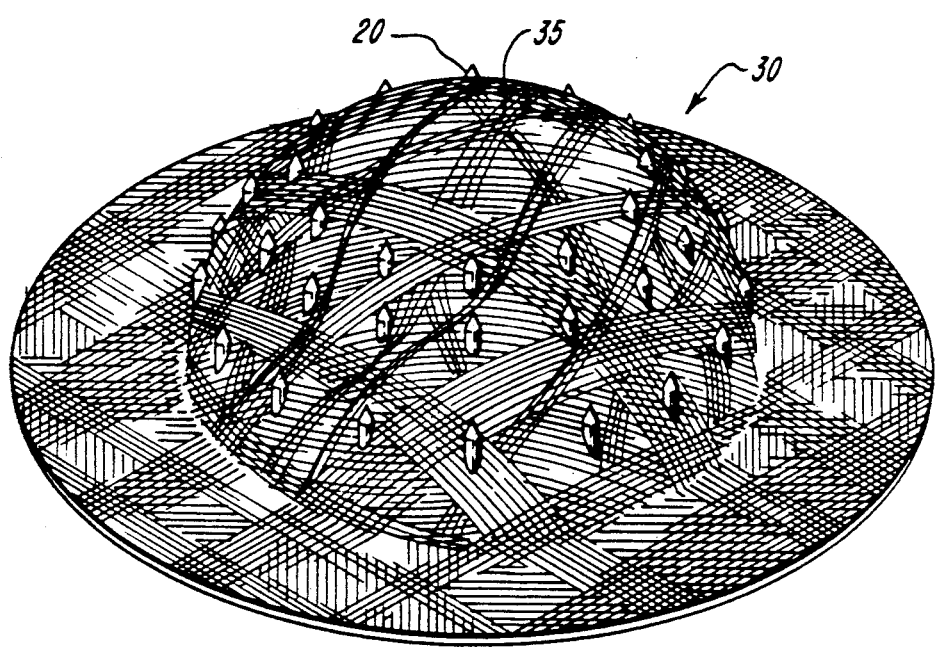
FIG. 2 is a perspective illustration of a composite workpiece in place on the studded portion of the first shaping die of FIG. 1, with the piecing studs and the fibers visible.
Figure 3:
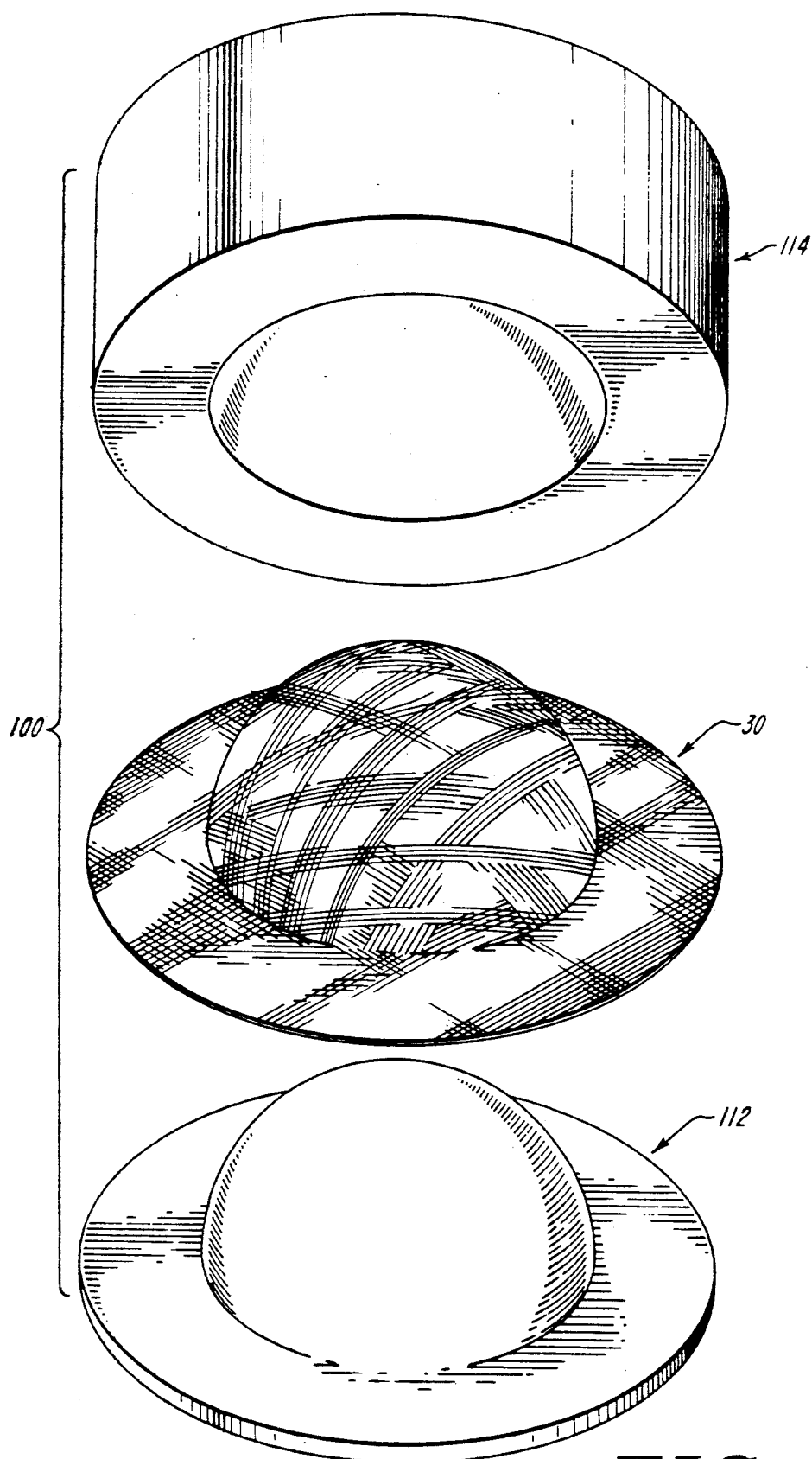
FIG. 3 is an exploded perspective illustration of a second shaping die and a finished composite article.

After laminate 30 has cooled, die 10 is opened. FIG. 2 shows laminate 30 on piercing portion 12 after opening. Piecing studs 20 are visible through laminate 30 and fibers 35 are shown as being pushed aside. The fibers 35 may be discontinuous or continuous fibers. Normally, laminate 30 is removed from die 10 and placed in a second die, a matched metal consolidation die, such as is shown in FIG. 3 as part 100. This die has the shape of the final part and is used for molding the composite into the final shape. As is evident, this shape is similar, but not necessarily identical, to the shape of piercing die 10. In fact, in a preferred embodiment of the invention, the female portion 114 of consolidation die 100 is the same as female portion 14 of piercing die 10. This allows the initial molding to be carried out on piercing die 10, followed by the retraction of piercing portion 12 with the retention of laminate 30 on female portion 14. Processing is continuous with male portion 112 mating with female portion 14. Using this procedure, laminate 30 need not be removed from the supporting die during processing.

The final shape of laminate 30 is made by heating and molding laminate 30 in consolidation die 100. As described previously, consolidation die 100 could be heated, transferring the heat to laminate 30. In most embodiments, the heating and molding under pressure of laminate 30 in consolidation die 100 not only retains the pattern of fibers 35 since there is low stress and tension on the workpiece since major shaping is carried out in the first step, but the thermoplastic resin and fibers are then allowed to flow sufficiently to fill in, or "heal" the holes formed by piercing studs 20.

Two other embodiments of the invention, which constitute minor modifications of the procedure just described, are also important. The first of these modifications is the use of the same piercing die 10 to perform both the rough forming step and the final forming. This can be accomplished by having the piercing studs 20 on male portion 12 be retractable. In operation, the piercing, rough forming step takes place using the same procedure as previously described. After the rough forming step, piercing studs 20 are retracted into male portion 12, yielding a smooth surface. Composite 30 would be continuously pressed by die 10, forming the final shape. In this process, an intermediate cooling step is not required. Since piercing studs 20 are retracted, the holes formed by piercing studs 20 will fill-in and the final form of composite 30 is achieved.

The second variation of the invention is to fill the holes formed by piecing studs 20 with transverse fibers or other reinforcing materials before final processing. These transverse inserts strengthen composite 30. One preferred method is to use piecing studs 20 not just as piercing studs but also as fiber pulling or material injecting components or as the reinforcements themselves. In another embodiment, piercing studs 20 are released from male portion 12 and become inserts in the final composite product. As final processing takes place, the flow of the thermoplastic resin locks the inserts in place, forming a much stronger shaped composite.

The method of the invention may be used with any composite or laminate, woven or unwoven. Although substantially any thermoplastic resin can be used in the invention, resins such as polyacrylates, polyesterimides, polyether ether ketone, polyethylene sulfide, nylon, polycarbonate, polyethylene, polypropylene, acrylonitrile butadiene styrene copolymer, polymethyl methacrylate, and polyamideimide are preferred. In like manner, almost any type of structural supporting fiber which keeps its own structure at temperature above the melting point of the thermoplastic resin can be used. The fibrous material useful in the invention includes fiber glass, carbon, graphite, boron and KEVLAR.

Those skilled in the art may determine variations on the materials and methods described herein. Such other variations are included within the following claims.

What is claimed is:

1. A method of controlling fiber movement during formation of a laminate of fibers in a thermoplastic resin matrix into a desired shaped comprising the steps of:

providing a laminate of fibers in a thermoplastic resin matrix to be formed into a desired shape;

rough forming said laminate into an approximation of said desired shape in a first shaping die having a surface portion, said first shaping die having piercing studs protruding from said surface in a preselected pattern for piercingly engaging said laminate in operation, and making holes therein;

completing the formation of said laminate in a second shaping die in the form of said desired shape, said second shaping die being free of said protruding piercing studs, whereby said holes formed by said piercing studs in said laminate are healed during said forming of said desired shapes.

2. The method of claim 1 wherein the edges of said composite are clamped during said rough forming step to provide uniform tension on said composite during piercing and rough forming.

3. The method of claim 1 wherein said fibers comprise continuous fibers.

4. The method of claim 1 wherein said fibers are discontinuous.

5. The method of claim 1 wherein said piercing studs are retractable.

6. The method of claim 5 wherein said first shaping die and said shaping die are the same, said method further comprising retracting said piercing studs when said composite nears final shape resulting in a continuous forming process.

7. The method of claim 1 wherein the method further comprises pre-heating said composite prior to rough forming to soften said thermoplastic resin.

8. The method of claim 1 wherein the method further includes pre-heating said first shaping die prior to rough forming to soften said thermoplastic resin.

* * * * *